United States Patent [19]
Chang et al.

[11] Patent Number: 6,055,326
[45] Date of Patent: Apr. 25, 2000

[54] METHOD FOR ORIENTING ELECTRONIC MEDICAL IMAGES

[75] Inventors: Chung-Fu Chang, Litchfield Park; Karen Pigott; Kermit Hu, both of Phoenix, all of Ariz.

[73] Assignees: Lockheed Martin Management; Data Systems-Reconnaissance Systems, both of Bethesda, Md.

[21] Appl. No.: 08/876,670

[22] Filed: Jun. 16, 1997

[51] Int. Cl.[7] .................................. G06K 9/00; H05G 1/06
[52] U.S. Cl. .................... 382/132; 382/128; 382/289; 382/296; 378/4; 378/20
[58] Field of Search ..................................... 382/128, 289, 382/297, 296, 132, 131; 378/4, 20

[56] References Cited

U.S. PATENT DOCUMENTS

| | | |
|---|---|---|
| 4,630,203 | 12/1986 | Szirtes ...................................... 364/414 |
| 5,421,331 | 6/1995 | Devito et al. ............................. 128/659 |
| 5,429,135 | 7/1995 | Hawman et al. ......................... 128/659 |
| 5,494,041 | 2/1996 | Wilk ......................................... 128/665 |
| 5,528,042 | 6/1996 | Hawman .............................. 250/363.04 |
| 5,570,430 | 10/1996 | Sheehan et al. ......................... 382/128 |
| 5,574,763 | 11/1996 | Dehner ....................................... 378/17 |
| 5,790,690 | 8/1998 | Doi et al. ................................. 382/128 |

*Primary Examiner*—Matthew C. Bella
*Attorney, Agent, or Firm*—Perman & Green, LLP

[57] ABSTRACT

A method for providing information of the orientation of chest and abdomen images on x-ray films. The method optically reads chest image and determines whether the image is a front or side image and the orientation of this image and the handedness of the image. The method also determines where the heart is in a chest front image and the direction the patient is facing in the case of a chest side image. The method optically reads an image and determines whether the image is an abdominal image or not and, if it is, the method determines the orientation of the patient with respect to the image plane.

9 Claims, 9 Drawing Sheets

METHOD FOR ORIENTING ELECTRONIC MEDICAL IMAGES

BACKGROUND OF THE INVENTION

1. Field of the Invention

The present invention relates to techniques for processing radiology images, and more particularly to methods for automatically orienting electronically acquired radiology images.

2. Background Art

In radiology technology, X-ray images are acquired using a phosphor plate. The phosphor plate is exposed using the same X-ray generator that has been used traditionally with film. The phosphor plate is then read in a Computed Radiology (CR) machine, resulting in a digital image. The digital image can be transported over a network, stored, retrieved, viewed, and diagnosed electronically.

An electronic image has a well defined top, bottom, right side, and left side. The image is in a raster format scanned from top to bottom and from left to right. The pixels in the image appear in rows with the first row being at the top of the image and the pixels in raster order from left to right.

The patient may have many different orientations in the image. The patent's head may be at any of the four sides of the electronic image. Furthermore, the image may have been acquired with the patient facing out instead of in, resulting in a mirror image, shifting the right to the left. The same effect can be caused by inverting the orientation of the imaging cassette as the image is acquired.

A very large percent of the images acquired in a hospital are chest images. Another frequently acquired images is abdomen images. The rest of the images are miscellaneous hands, feet, arms, legs, pelvises, heads, and shoulders. The chest images and the abdomen images have a natural orientation. The chest images may be either front (PA or AP) or side (Lateral). The abdomen images are invariably front images. The chest images are likely to be more than 50% of the regular X-ray images collected in a hospital. With the abdomen images the number of images of the two types may approach 70% of the images in the hospital.

Organizing the images and orienting the images for display can require a large amount of time for the radiologist. With the images organized for viewing a typical radiologist will require from three to five minutes to read an exam and dictate a report. If the radiologist must organize the exam several minutes longer will be required. A chest exam with two images should be organized with the PA image on the first monitor and the lateral image on the second monitor. A radiologist can move the images from one monitor to the other in about thirty seconds. If the images are oriented randomly as they are when acquired, the mis-oriented images must be rotated and possibly flipped, adding another 15 seconds per image. The result will be a typical addition on the order of one minute to the reading time for the mis-oriented images. This process will add 20% to 30% to the reading time for the radiologist.

In many hospitals the images are arranged for the radiologist by a technician. The technician will move the images such that the PA and Lateral images are correctly ordered and will orient the images such that the head is at the top and the heart is on the right side of the image for the PAs. The orientation of the laterals is up to the hospital. The head is oriented at the top and the patient is typically oriented facing toward the right. Similarly, the abdomen images are arranged so that the patient's head is at the top of the image for viewing.

If the image can be properly oriented automatically, the technician effort can be eliminated and the rest of the adjustment of the viewing can be done by the radiologist with little waste of time. The radiologist will typically adjust the window and level in the process of reading the images, so little extra time is spent if the window and level are not adjusted to a starting place for the radiologists.

The result is that the technician effort can be eliminated if the orientation of the images can be done effectively.

In medical technology electronic image acquisition is relatively new in medicine. While some digital images have been available, the bulk of the standard X-ray images have been on film. Consequently, there is no general background of medical processing of images to determine orientation.

However, the processing of non-medical digital images has had many image recognition and image orientation procedures developed. In automatic target recognition there have been neural network techniques developed that recognize generic shapes such as vehicles or aircraft. These algorithms must recognize the shapes regardless of orientation. Some of the algorithms recognize the orientation before attempting to recognize the shape.

Optical character recognizers must recognize the orientation of the characters that are being recognized. Typically the orientation is generally known as upright with ad-hoc techniques used to recognize the fine adjustments in the orientation necessary to proper character recognition.

A general technique useful for recognizing an isolated shape measures the moments of the image. The first moment in the X and Y direction can be used to determine the "center" of the image. A measure of the angular moment about the center can be used to find a center line. Further moments about the center line can be used to find bulges and other attributes of the image.

The difficulty with these schemes is that they generally do not apply to the medical images. The neural network approaches might be made to work, but will be complex and clumsy, requiring a large amount of computation. The techniques applied to character recognition cannot be adapted to medical images, since the techniques apply to objects that are already upright and for which the techniques are very ad-hoc applied to characters. The medical images generally do not have an isolated object to identify. The chest and abdomen images fill the full image. The simple measurement of moments will not be sensitive to the location of the heart in the chest cavity.

References relating to the technology of processing optically obtained digital medical images includes the following U.S. Patents.

U.S. Pat. No. 4,630,203 issued Dec. 16, 1986 to Szirtes entitled Contour Radiography: A System For Determining 3-Dimensional Contours Of An Object From Its 2-Dimensional Images describes a method and apparatus for reconstructing the three-dimensional coordinates of an identifiable contour on an object without relying on markers or pre-existing knowledge of the geometry of the object. Two X-ray sources irradiate an object possessing a radiographically identifiable contour and then the two images of the contour are projected onto an X-ray film at spaced locations on the film plane. These images are digitized by the tracing of the image curves with a cursor or some other means thereby establishing the coordinates of an arbitrary number of image points. Then the coordinates are processed with the spatial coordinates of the X-ray source to determine the three-dimensional coordinates of their originating space-point on the contour. In this way the three-dimensional coordinates of the contour are determined. The three-dimensional coordinates are then processed to visually display the reconstructed contour.

This patent is different from the present invention is that the contour radiology requires two x-ray films of the same object to be recorded simultaneously. Furthermore, the geometry of the data acquisition has to be pre-determined. Our algorithm is applied to X-ray films which represent a single projection of an object. The decision of the image orientation does not rely on the priori knowledge of the collection geometry.

U.S. Pat. No. 5,570,430 issued Oct. 29, 1996 to Sheeham et al. entitled METHOD FOR DETERMINING THE CONTOUR OF AN IN VIVO ORGAN USING MULTIPLE IMAGES FRAMES OF THE ORGAN discloses a method for automatically evaluating image data taking over a sequence of image frames to determine a contour of a left ventricle (LV). The sequence of image frames are converted to digital data that identify a gray scale value for each pixel in each image frame. Using probability, an initial LV region is estimated based upon previously determined priori parameters that are derived from processing manually drawn contours of the LV in other hearts, for the sequence of image frames being analyzed. The initial estimate of the LV region is refined using motion constraints, which are also derived from training data determined from the manually drawn contours of other hearts. An LV region is estimated and its coordinates are extracted for use in applying global shape constraints that provide a more accurate LV boundary estimate for the region around an apex of the left ventricle. Consistency, yielding an accepted estimate, or warning that the estimates are unreliable. The resulting automatically determined contours of each image frame can be displayed after the image data are produced.

This patent is different from the present invention because the 3-D contours of a left ventricle have to be determined from a series of 2-D image frames. In order to perform a 3-D image reconstruction, the image orientation of each 2-D frame has to be the same. The algorithm described in this patent does not address the automatic image orientation. It is assumed that images from frame to frame are aligned, and therefore, this reference is distinct from the present invention.

U.S. Pat. No. 5,574,763 issued Nov. 12, 1996 to Dehner entitled COMPUTED TOMOGRAPHY APPARATUS discloses a computed tomography apparatus which enables an optimum examination of the small intestine region, having a patient support which permits a scan to be conducted of a patient with the patient in an upright, slightly tilted, position, and a control unit containing the x-ray source and detector at the same angle relative to said patient support for all positions of the patient support during a scan. A three-dimensional image reconstruction ensues such that, given a contrast agent fill of hollow organs, the hollow organ is computationally sliced, a contrast agent trunk is computationally removed and the inside of the hollow organic is thus displayed.

This patent relates to an apparatus of computed tomography to enable an optimum examination of the small intestine region. It does not involve in the algorithm of automatic image orientation and is distinct from the present invention.

U.S. Pat. No. 5,421,331 issued Jan. 6, 1995 to Devito et al. entitled AUTOMATIC IDENTIFICATION OF THE LONG AXIS OF THE LEFT VENTRICLE FROM NUCLEAR MEDICINE SPECT DATA FOR USE IN MYOCARDIAL PERFUSION STUDIES discloses a technique wherein the long axis of the left ventricle is automatically identified by identifying, and correlating, local minima and maxima in images of slices of the left ventricle. Initially, the left ventricle is identified within a representative transverse slice of the left ventricle. The centerline of this slice is automatically computed and used as a reorientation axis, along which another (sagittal) slice of the left ventricle is reconstructed. The centerline of this sagittal slice is automatically computed, and is the long axis of the left ventricle.

This patent automatically identifies the long axis of the left ventricle from a singe photon emission computed tomography (SPECT) and is distinct from the present invention because the algorithm of the present invention does not require the identification of the long axis of the left ventricle in order to determine the image orientation of either chest x-ray or abdominal images.

U.S. Pat. No. 5,429,135 issued Jul. 4, 1995 to Hawman et al. entitled DETERMINING THE DEPTH OF AN ORGAN WHICH IS THE SUBJECT OF A NUCLEAR MEDICINE STUDY USING ONLY PLANAR IMAGE DATA discloses a technique wherein two planar nuclear medicine images of a target organ are acquired using a focusing collimator at two different heights. As automatic landmark associated with the target organic is computer-identified in each of the images, and the depth of the target organ is determined geometrically using the differences in size between the images of the identified landmark and the differences in height.

This patent is different from the present invention because it determines the depth of an organ by acquiring two planar nuclear medicine images using a focusing collimator at two different heights. The present invention determines image orientation with a single projection of an X-ray film.

U.S. Pat. No. 5,494,041 issued Feb. 27, 1996 to Wilk entitled METHOD FOR USE IN SURGICAL OPERATION discloses a system for use in performing surgery including a video camera for generating a video signal encoding an image of organs of a patient, a display operatively connected to the video camera for displaying the image in response to the video signal, and an identification device operatively connected to the video camera for automaticallly analyzing the video signal to identify organs in the image. The identification device is operatively connected to the display for displaying symbols on the display to identify at least one of the organs in the image.

The sensor used in this patent is a video camera rather than x-ray, sensor of the present invention. The algorithm described in patent recognizes gall bladder and bile duct, which are not relevant to the algorithm of the present invention. Furthermore automatic image orientation process is not mentioned in this patent. The image orientation is assumed to be known before the recognition of gall bladder and bile duct. Therefore, this patent is distinct from the present invention.

U.S. Pat. No. 5,528,042 issued Jun. 18, 1996 to Haeuman entitled RETROSPECTIVELY DETERMINING THE CENTER OF ROTATION OF A SCINTILLATION CAMERA DETECTOR FROM SPECT DATA ACQUIRED DURING A NUCLEAR MEDICINE STUDY discloses a technique wherein tow conjugate views of a patient are acquired during a SPECT nuclear medicine study. A common anatomical features is identified in the views. Based on the differences in location of the common feature in the views, the center of rotation ("COR") of the detector during the study can be calculated after the study has been concluded. This COR can then be used during image reconstruction to determine the location at which each filtered view is backprojected. This patent requires two conjugate views of the body of a patient in order to automatically determine the center of rotation of a scintillation camera detector. The present invention, on the other hand, determined the orientation of an image of a patient from a single projection and is distinct from the patent.

SUMMARY OF THE INVENTION

An object of the present invention is to provide methods for automatically orienting electronically obtained medical images.

Another object of the present invention is to provide a method for processing an electrically acquired X-ray chest image to determine if the image is a front or a side image and to determine the orientation of the image.

A further object of the present invention is to provide a method for processing an electronically acquired X-ray abdomen image to determine whether the image is an abdominal image and to determine the orientation of the image plane with respect to the patient.

Other and further features, advantages and benefits of the invention will become apparent in the allowing description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DISCLOSURE OF THE INVENTION

The invention disclosed herein is a method employing image segmentation and rules to determine the type of an X-ray image of a body and, based on the boundary of body parts, to determine the orientation of the X-ray image.

The X-ray images of a patient are acquired using a phosphor plate exposed then read in a Computed Radiology (CR) machine, resulting in a digital image. The electronic image has a well defined top, bottom, right side, and left side. The image is in a raster format scanned from top to bottom and from left to right. The pixels in the image appear in rows with the first row being at the top of the image and the pixels in raster order from left to right.

The patient may have many different orientations in the image. The patient's head may be at any of the four sides of the electronic image. Furthermore, the image may have been acquired with the patient facing out instead of in, resulting in a mirror image, shifting the right to the left. The same effect can be caused by inverting the orientation of the imaging cassette as the image is acquired. The chest images and the abdomen images of the patient have a natural orientation. The chest images may be either front (PA or AP) or side (Lateral). The abdomen images are invariably front images.

The method of the present invention processes "Chest" and "Abdomen" images for the orientation of the images.

In the method images are acquired of the patient with each image being labeled by image type in the information system database. In particular, chest images are labeled "Chest" and abdomen images are labeled "Abdomen".

The images are transferred to the picture archiving and communication system for storage and archiving and are also placed in a processing worklist for orientation processing.

For each image in the orientation processing worklist, the image and the label of the image are transferred to the orientation processor where the orientation processor will examine the image. If the type of image is "chest" or "abdomen"; the orientation processor will return to the information system an indication of the orientation of the image and the information system will use the information to indicate to viewing workstations the proper orientation for viewing of the images. The orientation processor may also return an error message that indicates that there was a problem. For example, if the image is the wrong size for a chest image, an error will be indicated that the image labeled "chest" is in fact not a chest image. Chest images are always 1760×2140 or 2140×1760 pixels.

The method of the present invention processes a chest image and determines whether the image is a front (i.e. PA or AP) image or a side (i.e. lateral) image. Once the front or side image is determined, the method further determines the orientation of this image. Finally, the left or right handedness of the image is determined. For a chest front image, the method determines where the heart is with respect to the patient. For a chest side image the method determines the direction of the patient is facing.

The method of the present invention processes an abdominal image and determines whether the image is an abdominal image or not. If this is an abdominal image, the method then determines the orientation of the patient with respect to the image plane.

Notations used in the description of the method for the orientations are as follows. The patient orientation relative to the image plane is specified by two letters that designate the anatomical direction of the positive row axis (left to right) an the positive column axis (top to bottom). The first entry is the direction of the rows, given by the direction of the last pixel in the first row from the first pixel in that row. The second entry is the direction of the columns, given by the direction of the last pixel in the first column from the first pixel in that column.

Figure 1A:
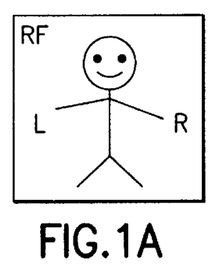
FIGS. 1A, 1B, 1C, 1D, 1E, 1F, 1G, and 1H are illustrations of examples of patient orientation for chest front images.
Figure 1B:
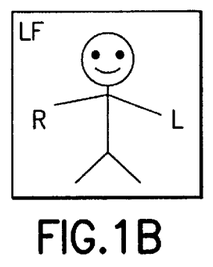
Figure 1C:
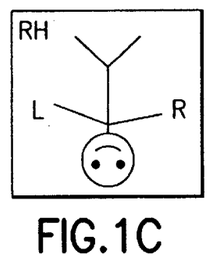
Figure 1D:
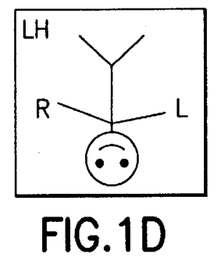
Figure 1E:
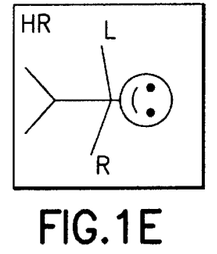
Figure 1F:
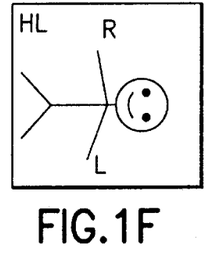
Figure 1G:
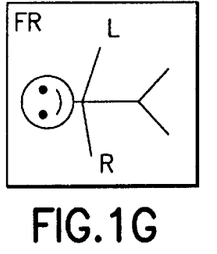
Figure 1H:
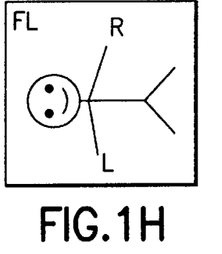
Figure 2A:
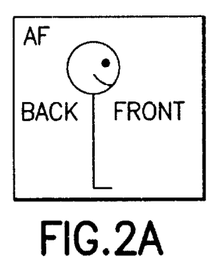
FIGS. 2A, 2B, 2C and 2D are illustrations of examples of patient orientation for chest side images.
Figure 2B:
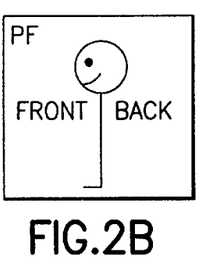
Figure 2C:
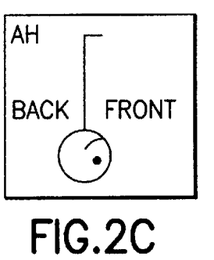
Figure 2D:
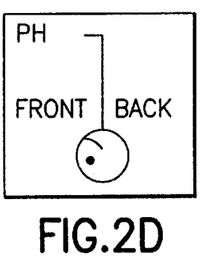
Figure 3A:
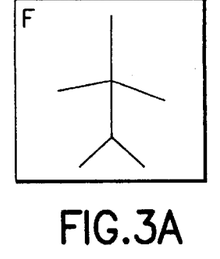
FIGS. 3A and 3B are illustrations of examples of patient orientation for abdominal images.
Figure 3B:
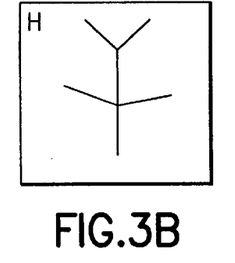

Anatomical direction is designated by the capital letters: A(anterior), P(posterior), R(right), L(left), H(head), F(foot). FIGS. 1A, 1B, 1C, 1D, 1E, 1F, 1G, and 1H illustrate the notation used by the algorithm to indicate patient's orientation in the chest front images. FIGS. 2A, 2B, 2C and 2D illustrate the notation indicating the patient's orientation in the chest side images. Abdominal images are normally taken AP, i.e. with the patient lying supine (on his/her back). Occasionally, one may take an over couch PA image with the patient lying prone (on his/her stomach) in order to squash the contrast filled small bowel loops out of the way so they do not overlap one another. However, radiologists would prefer the image conventionally orientated as an AP provided they knew how it was taken. Therefore, for abdominal images, the method outputs the H or F only, and there is no second letter involving L or R, as shown in FIGS. 3A and 3B.

Figure 4:
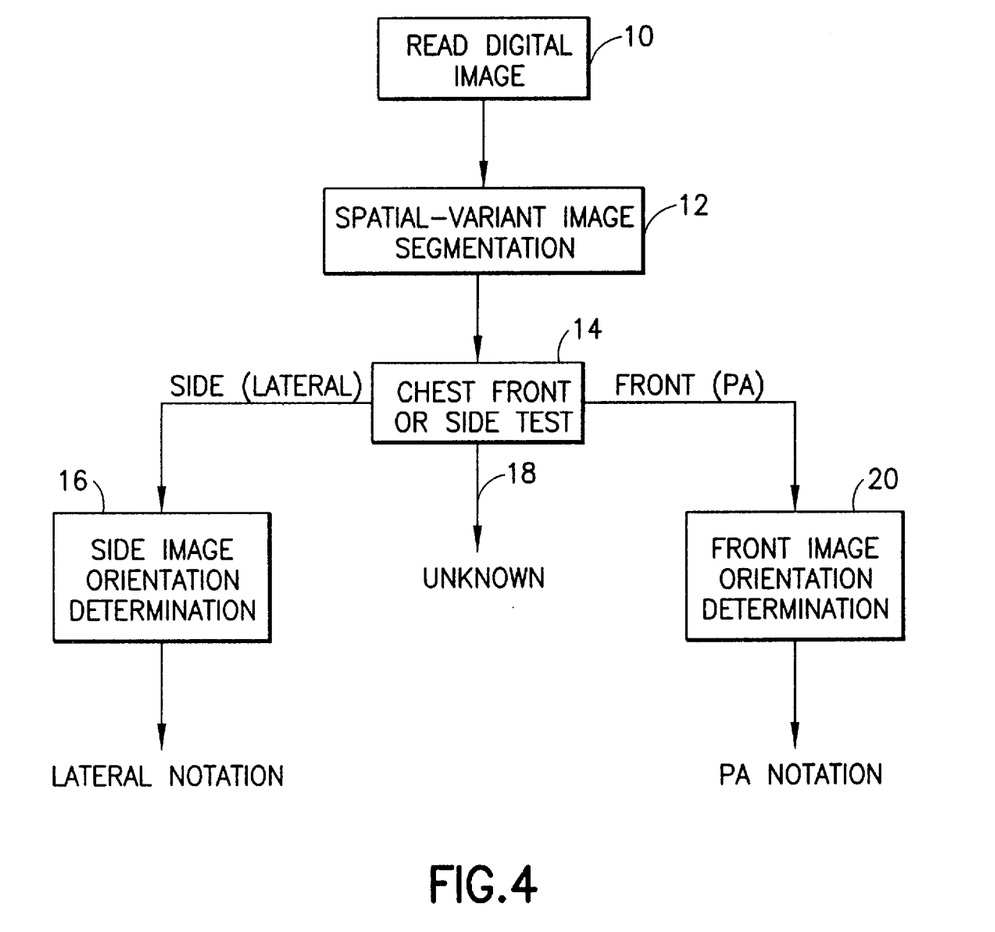
FIG. 4 is a schematic diagram of the steps of a process for determining the orientation of chest images according to the principles of the present invention.

The method of determining the orientation of a chest image is composed of four steps, shown in the FIG. 4. In step 10 a digital chest image is first read in by the algorithm and then segmented into a binary image, based on the pixel amplitude on step 12. In step 14 the method determines whether the chest image is a side or a front image based on the segmented image. If the method is unable to determine whether the image is a side or front image in step 18, the output will be an "Unknown".

If the image is determined to be a side image, the method in step 16 then determines where the patient is facing. The output of the method will be a notation used for a chest side image.

If the image is determined to be a front image in step 20, the method determines the orientation of the patient. The output of the method will be a notation used for a chest front image.

In the "read digital image" step 10 of FIG. 4, the method of the present invention can be embodied to accept the digital data in any format in the current present example the method reads digital data in a format of 2-byte per pixel without any header information in the data. The image size is a part of the input to the algorithm, which input is supplied by the user.

In the "spatial-variant image segmentation", step 12, it is taken into consideration that a chest image covers many organs in the upper body. Each organ reveals a different optical density on the x-ray film. Furthermore, the x-ray intensities across the entire image are not a constant value. The threshold used in the upper portion of the image to segment lungs will not be the same as that used in the lower portion of the images because it is very difficult to use one threshold to segment the lungs out of the entire image.

The method of the present invention in step 12 performs an image segmentation by dividing the images into 4 by 4 subimages. There is a 50% overlap between adjacent subimages. The method selects the threshold for each subimage. In so doing, the threshold used to segment lungs will be spatially varying. The output of this process is a binary image; pixels in lungs as well as the area outside the body are assigned to be 0, and pixels in other area assigned to be 1.

Figure 5:
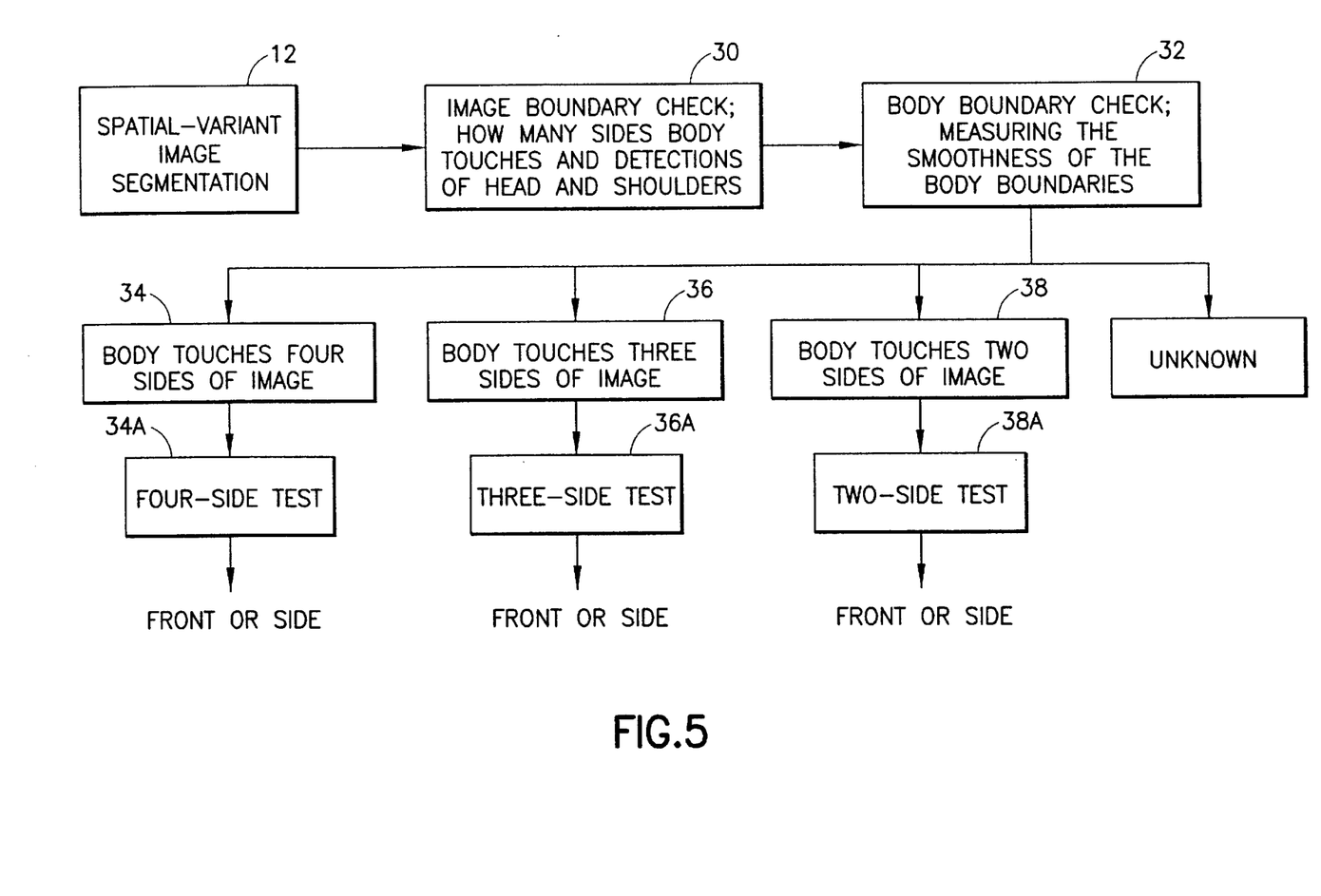
FIG. 5 is a schematic diagram of the steps of a process according to the present invention for determining whether a chest image is a side or a front image.

The "chest front or side test" step 14 of FIG. 4 determines whether a chest image is a side or a front chest image, as shown in more detail in FIG. 5. The input image to this process is a segmented image obtained from the spatial varying image segmentation step 12 of FIG. 4. There are two major subprocesses, the image boundary check step 30 and the body boundary check, step 32. Image Boundary Check, step 30 detects the presence of a head or shoulder(s) and reports how many sides of the image plane are touched by the body. The process to detect head or shoulder is based on the length and the location of the region where the body touches the boundary of the image. If the region is more than 80 pixels and less than 20 pixels in length, the method calls and detects the image as either a head or a shoulder. If the center of the region is more than 55 pixels away from the mid-point of the image side, then the method decides that there is a shoulder detected. Otherwise, the method decides a head is detected. The step 30 detects whether there is a head or shoulder(s) for every side that the body touches the image. The results of detecting head or shoulder(s) are also used by later process to determine the orientation of a chest front image.

Figure 6:
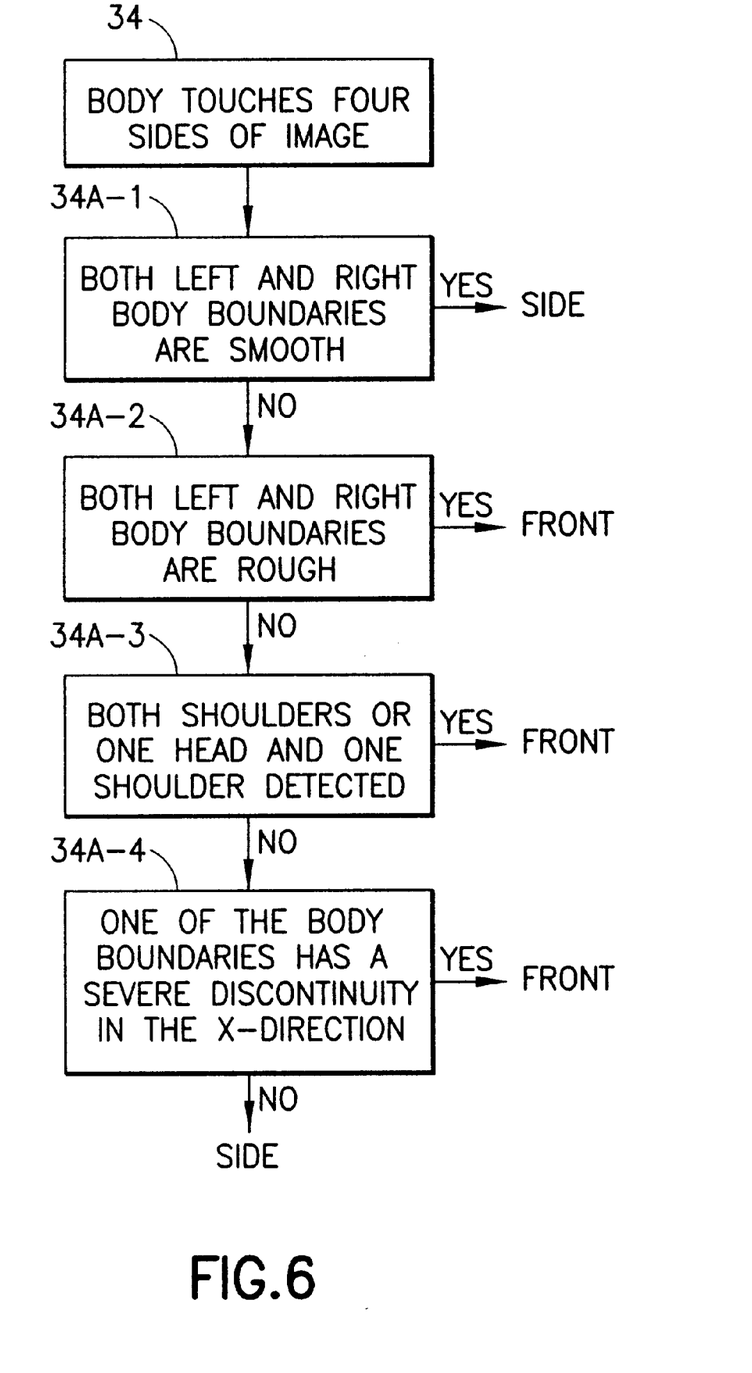
FIG. 6 is a schematic diagram of the steps of a process according to the present invention for determining whether an image of a body is a front or side image when the body touches four sides of the image.

Step 32 of FIG. 5 detects and locates body boundaries (both left and right). Furthermore, the smoothness of each boundary is measured. The smoothness of a boundary is measured by the number of a sudden change of the slope of the curve. The decision of a side image or a front image depends on the measurements of these two processes. If the body touches four sides of the image in step 34 of FIG. 5 then the four-side test step 34-A is performed, which is shown in more detail in FIG. 6. The severe discontinuity mentioned in step 34A-4 of FIG. 6 is referring to the x (horizontal) location of the left boundary of the body being more than two thirds of the image width, or the x location of the right boundary being less than one third of the image width. Both situations are spurious due to the existence of the lung lobes in the measured boundaries. Nevertheless, the severe discontinuity exists only in some of the chest front images and never occurs in the chest side image. Therefore, whenever it happens, the method concludes that the image is a front image.

Figure 7:
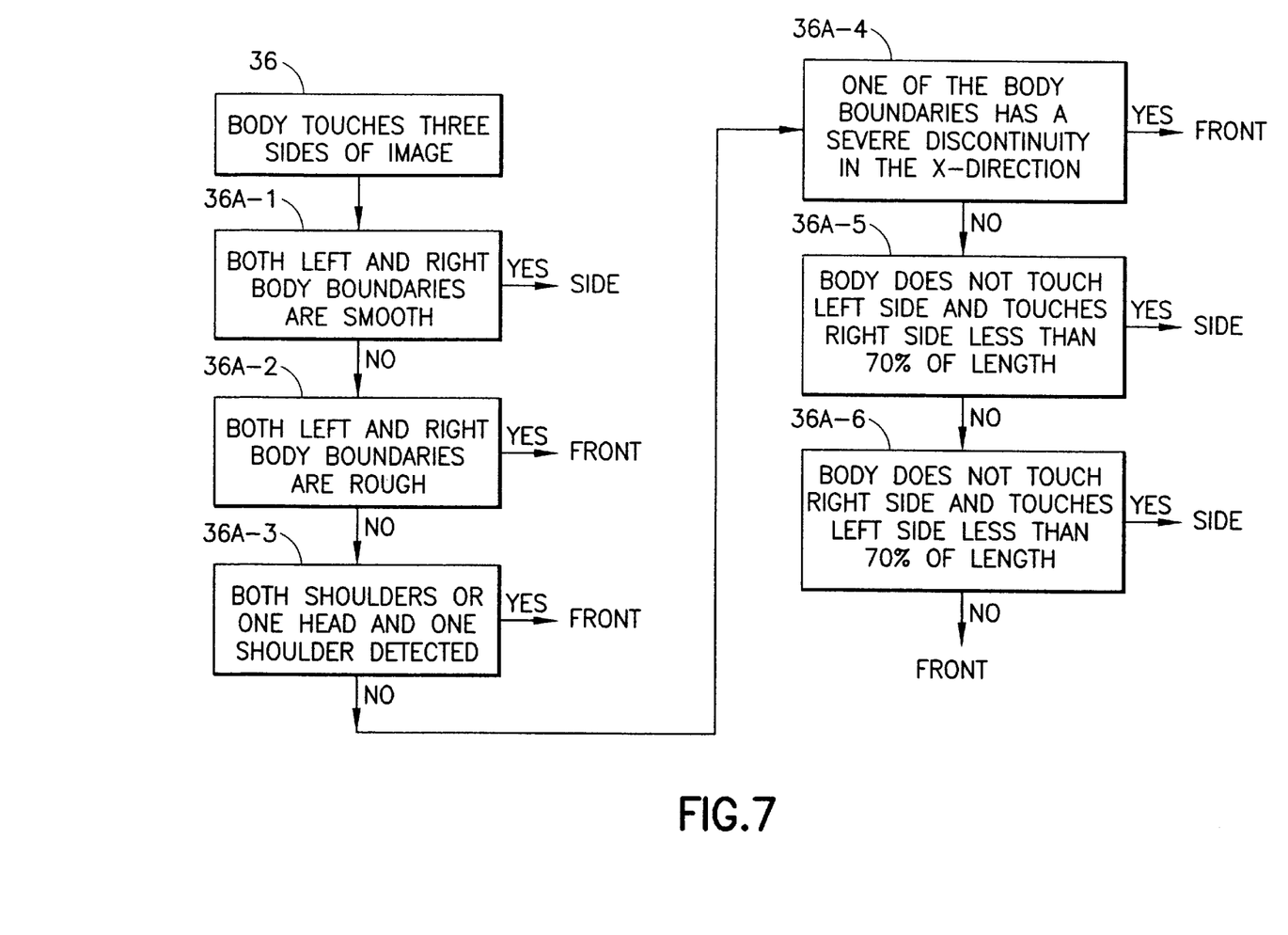
FIG. 7 is a schematic diagram of the steps of a process for determining whether an image of a body is a front or side image when the body touches three sides of the image.
Figure 8:
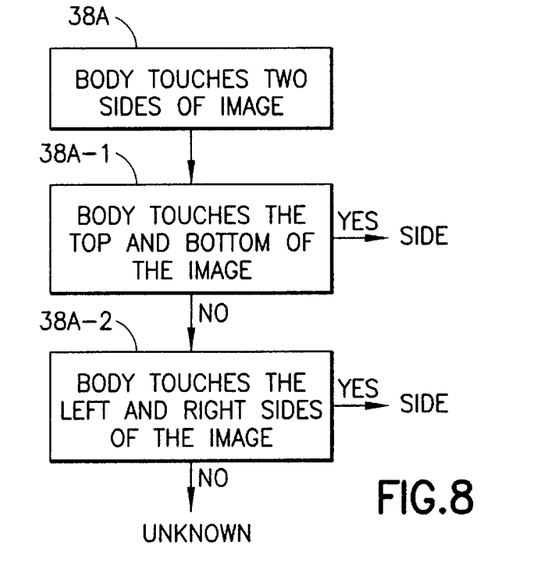
FIG. 8 is a schematic diagram of the steps of a process according to the present invention for determining whether an image of a body is a side image or an "unknown" when the body touches only two sides of the image.

If the body touches three sides of the image in step 36 of FIG. 5, then the three-side Test 36A is performed which is shown in more detail in FIG. 7. If the body touches only two sides of the image as determined in step 38, then it can only be a side image and the two-side Test 38A shown in detail in FIG. 8 is performed. However if the two sides are not on the opposite sides, then the method will return an "Unknown" to the main program, as shown in FIG. 8 because it is most likely not a chest image. Similarly, if the body touches less than two sides of the image plane, the algorithm returns an "Unknown" to the main program.

Figure 9:
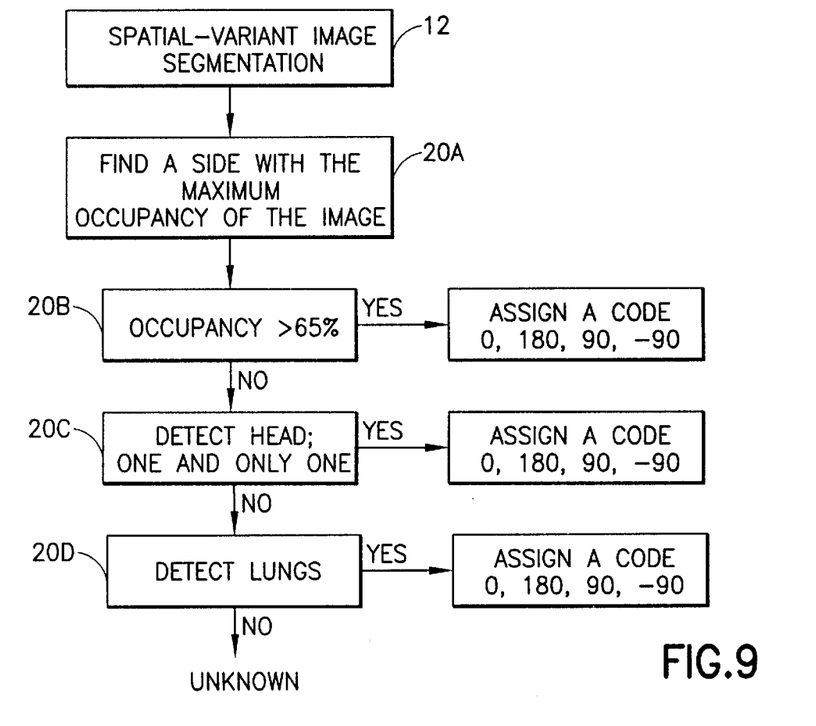
FIG. 9 is a schematic diagram of the steps of a process according to the present invention for determining the orientation of a chest front image.

Referring again to FIG. 4, once a chest image is determined to be a front image in step 20 then the method determines patient's orientation based on the percentages of the bright pixels of each side of the segmented image using the steps set forth in FIG. 9. The foot of the chest front image is the side which has the maximum percentage. However, the percentage has to be more than 65% as determined in step 20B. If more than 65%, a code will be assigned to represent patient's orientation. If the bottom of the chest is at the bottom of the image, the code is 0. If the bottom is at the top of the image, the code is 180. If the bottom is at the left-hand side of the image, the code is −90. If the bottom is at the right-hand side, the code is 90.

If the maximum percentage fails to meet the requirement, 65%, the algorithm then checks the detection of a head in step 20C. If a head is detected on one and only one side of the image, then a code (0,180 −90 or 90) will be assigned. If a head is detected at the top of the image, the code is 0. If a head is detected at the bottom of the image the code is 180. If a head is detected at the left of the image the code is 90. If a head is detected at the right of the image the code is −90. With these two processes, most images will be assigned with a code. However, if there are still images whose orientation fail to be determined by these two requirements, the method will detect lungs on these images in step 20D. Since the lung detection process is more computationally intensive, the method will apply only to those images whose orientation is still not determined at this stage. After the lung detection, if the orientation of the image is still not determined, the algorithm will return a notation "Unknown" back to the main program.

The detection of lungs in step 20D is performed by checking the presence of two dark sections in a given record (line) of the segmented image. Each dark section has to be longer than 40 pixels and shorter than 140 pixels. Furthermore, if the separation between two dark sections is less than 50 pixels, then the second dark section will not be counted. The algorithm will check four (top, bottom, left and right regions) of the image.

The top region starts at ¼* (y-size) away from the top image border (y-direction), and the regions is 100 pixels in length (y-direction ). Each line starts and ends at 25 pixels (x-direction) away from the left and right image borders. The bottom region starts at ¾* (y-size) away from the top image border (y-direction), and the regions is 100 pixels in length (y-direction). Each line starts and ends at 25 pixels (x-direction) away from the left and the right image borders. The left region starts at ¼* (x-size ) away from the left image border (x-direction ), and the region is 100 pixels in length (x-direction). Each line starts and ends at 25 pixels (y-direction) away from the top and bottom image borders. The right region starts at ¾* (x-size) away from the left image border (x-direction), and the region is 100 pixels in length (x-direction). Each line starts and ends at 25 pixels (y-direction) away from the top and bottom image borders.

Out of the measurements obtained from these four regions, the region containing most lines that have two dark sections, is the upper portion of the chest of the patient. If the upper portion of the chest of the patient is at the top of the image, the code is 0. If the upper portion of the chest of the patent is at the bottom of the image, the code is 180. If the upper portion of the chest of the patient is at the right of the image, the code is −90. If the upper portion of the chest of the patent is at the left of the image, the code is 90. Therefore, the orientation of the image is thus determined. If there are no regions containing two dark sections, the method returns a notation of: "Unknown".

Figure 10:
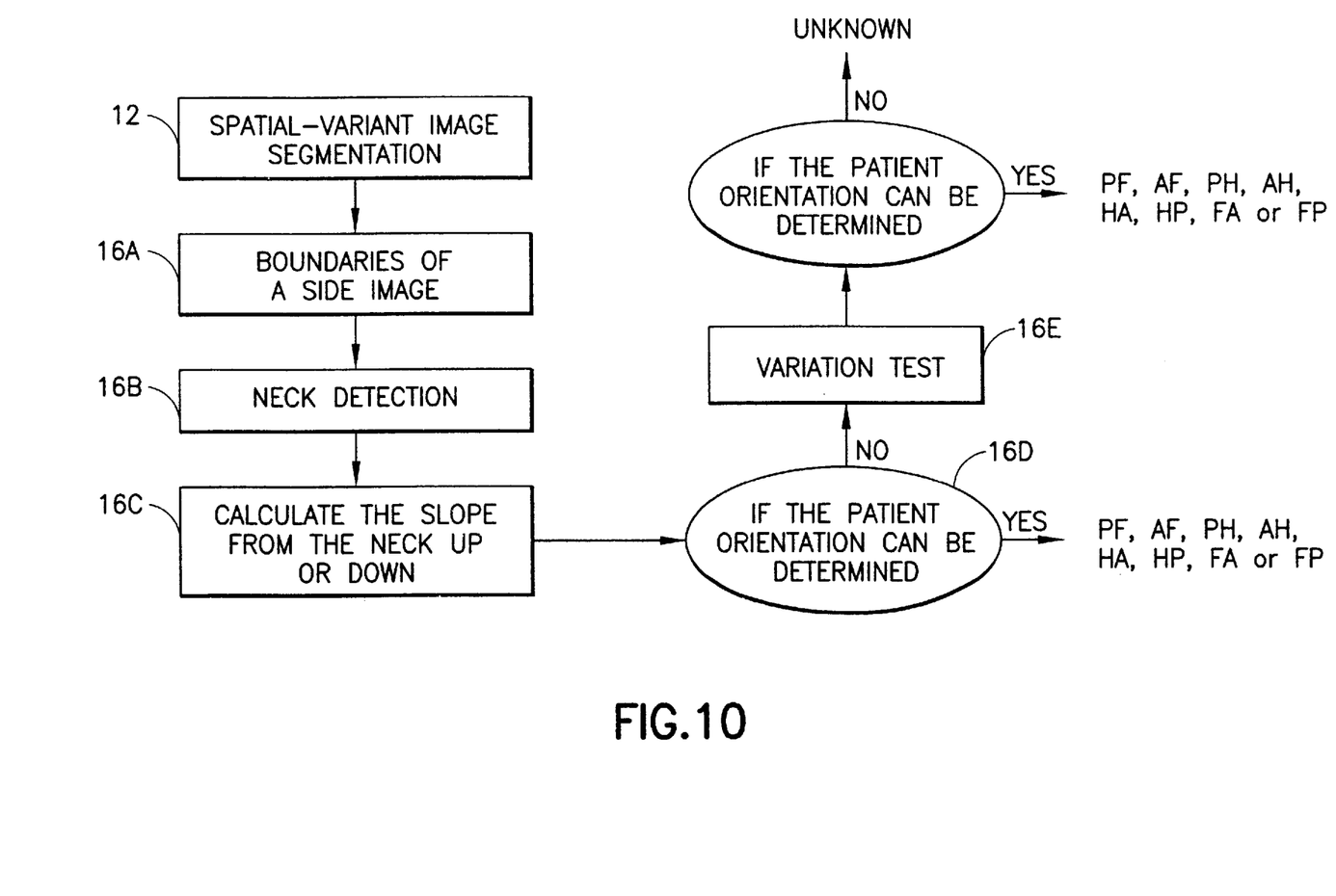
FIG. 10 is a schematic diagram of the steps of a process according to the present invention for determining the orientation of a chest side image.

Referring to FIG. 10, the steps of the method of the determination of the side image is shown in more detail in step 16A. The left and right boundaries of the segmented image are first generated. (step 16 of FIG. 4) The neck region of the segmented image is detected in step 16B by calculating the minimum separation in the horizontal direction (x-direction) between two boundaries. The neck region may be at the upper portion of the image or at the lower portion of the image. If it is at the lower portion, the method concludes that the side image is up-side-down. The method then calculates that slopes of the boundaries from the neck up to the top of the image in step 16C. If the neck region is at the bottom portion of the image, the method calculates the slopes of the boundaries from the neck down to the bottom of the image. In step 16D if the slopes of both boundaries are positive and the neck is at the top portion of the image, the notation of the output is AF. If the slopes of both boundaries are negative and the neck is at the top portion of the image, the notation of the output is PF. If the slopes of both boundaries are positive and the neck is at the bottom portion of the image, the notation of the output is PH. If the slopes of both boundaries are negative and the neck is at the bottom portion of the image, the notation of the output is AH.

If the slopes of the boundaries are not all positive or all negative, the method will perform a variation test on two boundaries in step 16E. the variation check is a measurement of variation of the boundary from a straight vertical line. The more variation of the boundary, the more likely it is an anterior of the body.

If the method still is not able to determine the orientation of a patient in step 16F, the return to the main program is "Unknown".

If the side image is rotated by 90° or −90°, the method will rotate the image and perform the same task described above. Depending upon the location of the neck and the slope of the boundaries of the segmented image, the method assigns the image with notations such as HA, HP, FA or FP.

Figure 11:
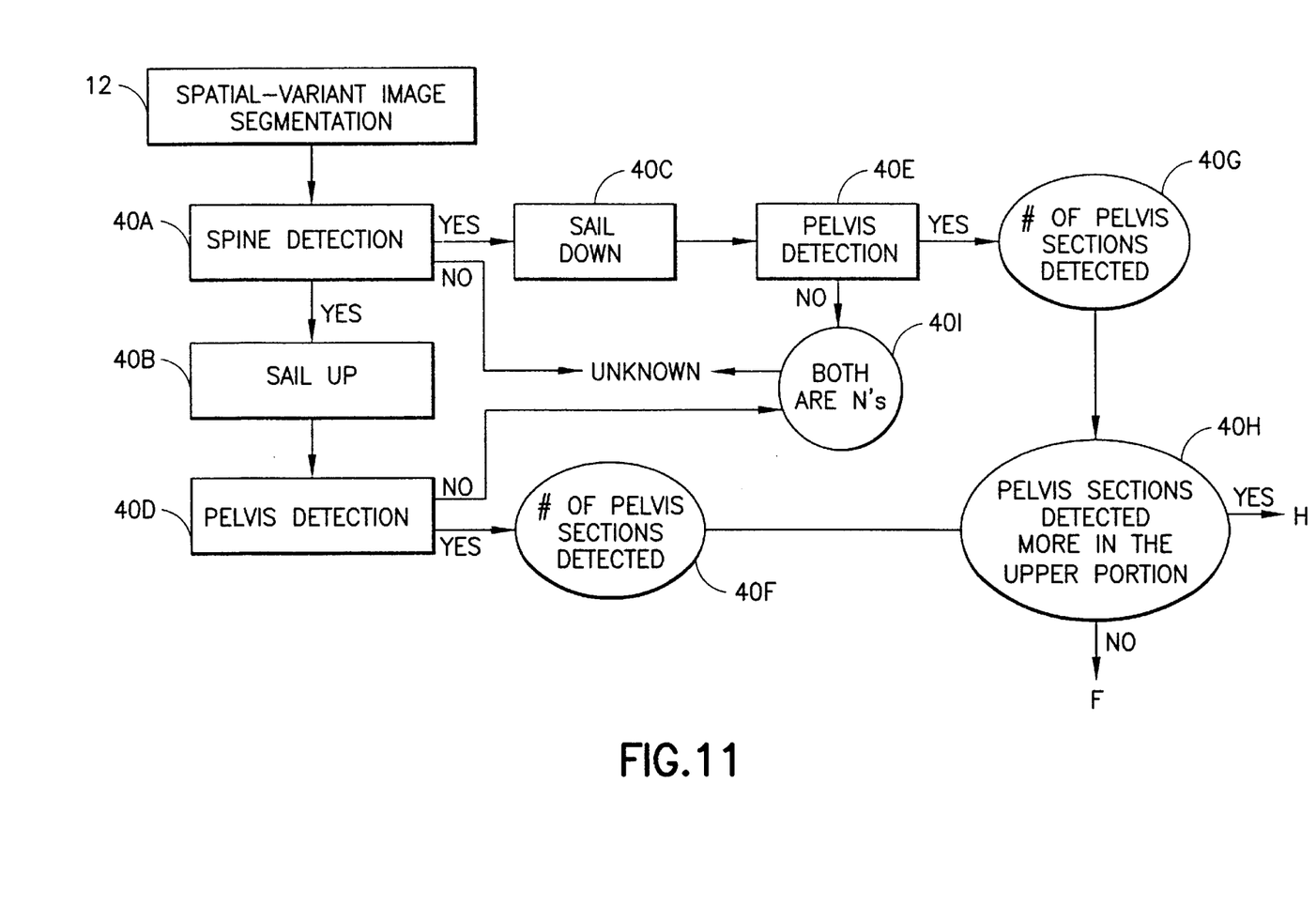
FIG. 11 is a schematic diagram of the steps of a process according to the present invention for determining the orientation of abdominal images.

FIG. 11 illustrates the steps of the abdominal orientation process for the conditions shown in FIGS. 3A and 3B. The original image is segmented by the same spatially varying image segmentation process described for the chest orientation process. The only difference is that the image is inverted first; i.e. the contrast of the image is reversed. Objects of interest in abdominal images are bones, which are bright pixels rather than lungs, which are dark pixels. In step 40A the method takes the segmented image and detects a portion of a spine in the central region of the image. The method uses the region centered at the center of image and with 150 pixels in length on each side. The match size of a spine is 70 pixels in width and 120 pixels in length Once the maximum match is found, a 70×30 box is used to sail up and down vertically in steps 40B and 40C. If the total number of dark pixels with the box is more than 90% of the box, the sail process terminates.

These are two terminal points in the process. One at the top portion of the image, and the other one is at the bottom portion of the image.

The pelvis detection process (steps 40D and 40E) involves the detection of a bright region on both left and right side of the terminal point, which represents the bladder region of the reversed image. Once the bright region is found, the method tries to find the first dark region afterwards. If a dark region is found, a section of the pelvis is detected. If there is no pelvis section found by both sail-up or the sail-down processes, the method step 401 returns a notation "Unknown". Otherwise, the comparison is made on step 40H between the number of pelvis sections found in the top portion (step 40F) of the image and that of the bottom portion of the image. (step 40G). The larger one indicates the location of the pelvis. Therefore, in step 40H, a notation of "F" returns to the main program, if bottom portion has more pelvis sections. A notation of "H" in step 40H returns the process to the main program, if the top portion has more pelvis sections.

Figure 12:
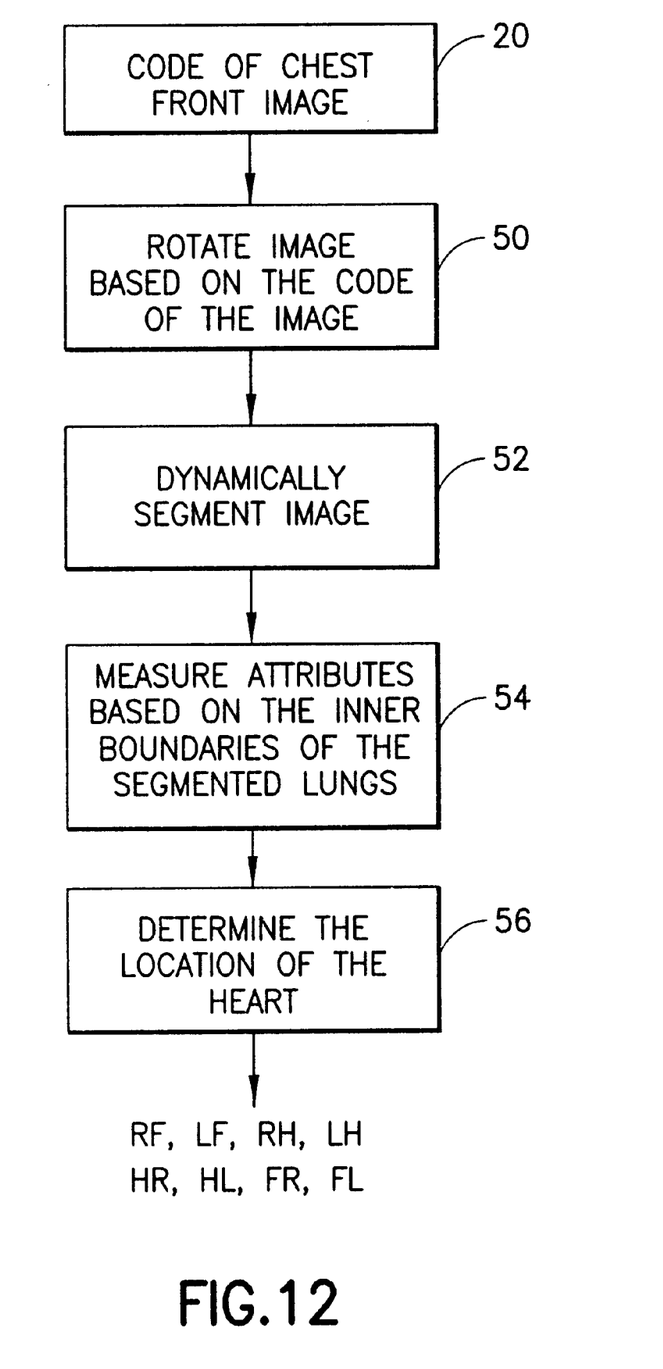
FIG. 12 is a schematic diagram of the steps of a process according to the present invention for determining the handedness of the chest front image.

The last step of the chest front process is to determine the handedness of the image, i.e. where the heart is, as shown in FIG. 12, since the patient's orientation has been determined at this stage, the decision of the location of the heart is based on the measurement of the inner boundaries of the two lungs. The goal of image segmentation is to depict the boundary of the lungs. The image segmentation needs to be more adaptive to the variation of the image intensity across the lung.

The code of the chest front image (step 20 in FIG. 4 as determined in FIG. 9) is used in FIG. 12 wherein in step 50 the image is rotated based on the code. The image is then dynamically segmented in step 52.

To dynamically segment the image in step 52, the threshold of the image segmentation is continuously increased until the separation between the upper portions of two segmented lungs reach a minimal distance, 75 pixels. The threshold values vary for different images due to their variable intensities.

Once the inner boundaries of two lungs are depicted, measurements of these two boundary segments are performed in step 54. Measurements include (1) the area between the meridian and the boundary of the lung, (2) the second differences of the boundaries, and (3) the width of the lower section of the lung.

The area measurement is defined as the sum of all the difference in x-coordinate between the meridian and the inner boundary of a lung. The sum is then divided by the difference of y-coordinate between the starting point and the ending point. In so doing, the area is normalized so that the section lengths have no impact on the measurement. The meridian is defined as the half point between the leftmost point in the boundary of the right lung and the rightmost point in the boundary of the left lung.

The method calculates the second difference of the boundaries in order to define the area to measure. The boundaries are divided into five sections with equal number of points. The second lengths between the left boundary and the right boundary may be different. The second difference, difference of the slop, of each section is calculated. If the latter slope is less than the former slope by more than 22°, then the first point of the latter slope is starting point for the area measurement. If this large second difference only occurs in one of the lungs, the area measurements start at the third section of each boundary.

In step 56 it is determined where the heart is to provide an indication of the handedness of the chest front image. If the area measured from the inner boundary of the left lung is 12% larger than that from the inner boundary of the right lung, then the heart is on the left hand side. Similarly, if the right area is 12% larger than the left area, then the heart is on the right hand side.

As previously mentioned, the lung boundary is divided into five sections. The width of a lung is measured from the starting point of the last section and horizontally towards the outer boundary of the lung. If the left lung has a width 10% shorter than that of the right lung, the heart is on the left hand side. Conversely, the heart is on the right hand side.

The angles of the inner boundaries are also measured. The angles of the sections on the left boundary are then converted to the difference between the measured angles and 90° (i.e. angle_new_1=90°−angle_old_1). Meanwhile, the angles of the sections on the right boundary are represented as angle_new_r=angle_old_r−90°. If the sum of thus calculated angles on the left hand side is larger than that of the right-hand side by more than 10°, the heart is on the left-hand side. Conversely, the heart is on the right hand side.

If the boundary of the lung is too short such that a reliable measurement cannot be made, the method employs a prior knowledge to decide that the heart is on the right hand side of the image.

What has been described is a process for automatically orienting electronically acquired radiology images and for determining if the image is a chest or abdominal image, whether if the image is a front or side image, and the orientation of the image plane with respect to the patient.

It should be understood that the foregoing description is only illustrative of the invention. Various alternative and modifications can be devices by those skilled in the art without departing from the scope of the invention. Accordingly, the present invention is intended to embrace all such alternative, modifications and variances which fall within the scope of the appended claims.

What is claimed is:

1. A method for processing and orientating radiology chest and abdominal images comprising the steps of:

a) optically reading radiology data to produce a digital data image;

b) providing a spatial—variant image segmentation of the digital image;

c) determining from the digital image size whether the image is a chest image or an abdominal image;

d) for a chest image, determining from the boundaries of the image whether the image is a front chest image or a side chest image;

e) for a side chest image, determining the orientation of the side chest image based on the slopes of the boundaries of the side chest image; and f) for a front chest image, determining the orientation of front chest image based on the percentage of bright pixels on each side of the front chest image.

2. A method for processing and orienting radiology chest and abdominal images according to claim 1, further including after step c, the steps of:

g) for an abdominal image, detecting the spine portion of the abdominal image by determining the maximum number of bright pixels;

h) sailing up and sailing down the image to determine a top terminal portion and a bottom terminal portion of the abdominal image;

i) determining the pelvis portions of the abdominal image by, finding a bright region of each side of the terminal points and then a subsequent dark region; and j) determining whether there are more pelvis portions in top or the bottom portions of the image and providing an "F" notation if the bottom portion of the image has more pelvis sections and an "H" if the top portion has more pelvis sections.

3. A method according to claim 1 wherein the step d of determining whether the image is a front chest image or a side chest image further includes the following substeps:

k) performing an image boundary check by detecting the presence of an image of a head or shoulder and detecting how many side of the image plane are touched by the image of the body, wherein the detection is based on the length and location of the region where the body touches the boundary sides of the image;

l) performing a body boundary check to detect and locate body boundaries in the image plane by measuring the smoothness of the body boundaries; and wherein, if the body touches four sides of the image plane and both left and right body boundaries are smooth, the image is a side chest image, if both left and right body boundaries are rough the image is a front chest image, if both shoulders or one head and one shoulder is detected the image is a front chest image, if one of the body boundaries has a severe discontinuity in the horizontal (x) direction the image is a front image.

4. A method according to claim 3 wherein, if the body touches three sides of the image plane and both left and right body boundaries are smooth, the image is a side chest image, if both left and right body boundaries are rough the image is a front chest image, if both shoulders or one head and one shoulder is detected the image is a front chest image, if one of the body boundaries has a severe discontinuity in the horizontal (x) direction the image is a front image, if the body does not touch the left side of the image plane and touches the right side of the image plane with less than 70 percent of length, the image is a side image; and if the body does not touch the right side of the image plane and touches the left side of the image plane with less than 70 percent of length, the image is a side image.

5. A method according to claim 3 wherein if the body touches two sides of the image plane and the body touches the top and bottom of the image plane or if the body touches the left and right sides of the image plane the image plane is a side image.

6. A method according to claim 1 wherein if the chest image is determined in Step 4 to be a front chest image, the method further includes determining the orientation of the body based on the percentages of the bright pixels at each side of the segmented image including the further steps of:

finding the side of the image plane having the maximum occupancy of the image and assigning code elements wherein for an occupancy of greater than 65 percent assigning a 180, 90 or −90 code element, wherein if the bottom of the chest is at the bottom of the image plane a 0 code element is assigned, if the bottom of the chest is at the top of the image plane a 180 code element is assigned, if the bottom of the chest is at the left side of the image plane a −90 code element is assigned, if the bottom of the chest element is at the right side of the image plane a 90 code element is assigned.

7. A method according to claim 6 wherein for a maximum occupancy of the image less than 65 percent, the further steps of detecting a head on one and only one side of the image and assigning a 0, 180, −90 or 90 code element wherein if the head at the top of the image a 0 code element is assigned if the head is at the bottom of the image a code element of 180 is assigned, if the head is at the left of the image a code element of 90 is assigned, if the head is at the right of the image a code element −90 is assigned.

8. A method according to claim 7 wherein for a maximum occupancy of the image less than 65% and a head is not detected, the further steps of detecting two dark sections representative of the upper portion of the chest and lungs and assigning a 0, 180, 90, −90 code element wherein if the upper portion of the chest is at the top of the image, the code is zero, if the upper portion of the chest is at the bottom of the image, the code is 180, if the upper portion of the chest is at the right of the image the code is −90 and if the upper portion of the chest is at the left of the image, the code is 90.

9. A method according to claim 1 wherein of the chest image is determined in step 4 to be a front chest image the method further includes determining where the heart is by measuring the inner boundaries of the two lungs including the further steps of:

rotating the image based on the code element of the image, dynamically segmenting the rotated image measuring the attributes of the image segments based on the inner boundaries of the segmented lungs and determining the location of the heart from the measured attributes.

* * * * *